United States Patent Office 3,043,535
Patented July 10, 1962

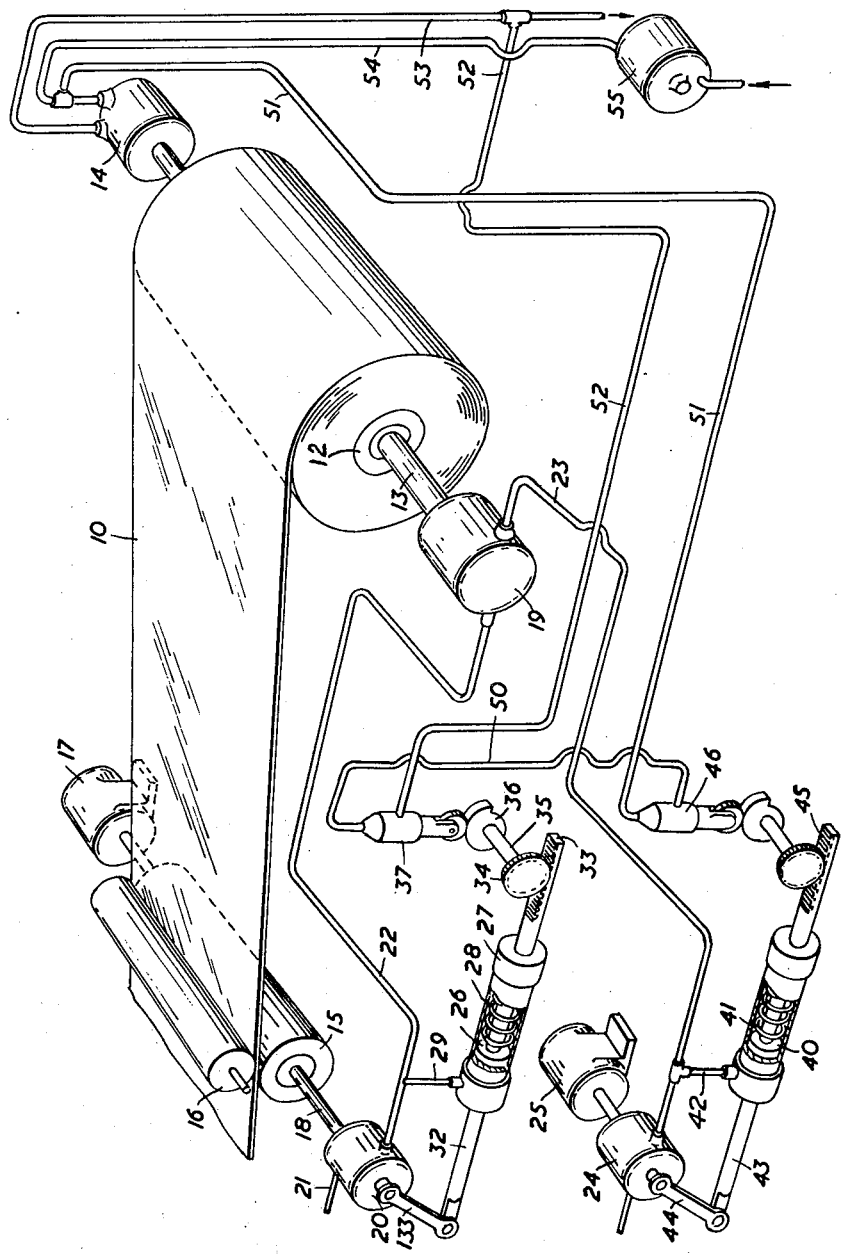

3,043,535
HYDRAULIC DRIVE FOR WINDING MACHINES
George Edward Chittenden, Allesley, Coventry, England, assignor to The Keelavite Company Limited, Coventry, England, a British company
Filed Mar. 31, 1958, Ser. No. 725,199
Claims priority, application Great Britain Apr. 5, 1957
5 Claims. (Cl. 242—75.53)

This invention relates to control means for automatically interrelating and relatively varying the speeds of rotary members or rolls such as are employed in winding of flexible material.

It is the primary object of the invention to provide a major adjustment of the relative rotational speeds of the rolls or members as theoretically necessary to maintain a constant tension on the flexible material passing between them and wound around one of them, and further to superimpose on this first adjustment an additional adjustment, which takes into account that the frictional losses in the fluid driving motor for one of the rolls will vary in accordance with variations in its speed.

The invention may be carried into practice in a number of ways but one specific embodiment will now be described by way of example with reference to the accompanying drawing in which the invention is shown diagrammatically as applied to the control of the tension in a web.

Thus the drawing shows mechanism for winding in or unwinding a web 10 for example of paper, comprising a drum 12, referred to herein as a winding drum, mounted on a shaft 13 and arranged to be driven, when the apparatus is used for winding-in, by a hydraulic motor 14 so as to draw the web 10 from between rollers 15 and 16, one of which rollers 15 is mounted on a shaft 18 and arranged to be driven by a constant or variable speed motor 17.

Arranged to be driven respectively by the shaft 13 of the drum 12 and by the shaft 18 of the roller 15 are metering pumps 19 and 20 respectively. When winding-in, the metering pump 20 is connected by a passage 21 to a fluid supply reservoir whilst its outlet is connected by a pipe 22, referred to herein as the main control pressure passage, to the inlet of the other metering pump 19. The outlet of the pump 19 is in turn connected by a pipe 23, referred to herein as the subsidiary control pressure passage, to the inlet of a third metering pump 24 connected to be driven by a constant speed electric motor 25. The outlet of the third pump 24 is connected to the fluid supply reservoir. In instances where the apparatus is used for control of the unwinding of the web from the drum 12 the fluid will of course flow through the metering pumps in the opposite direction.

The metering pump 19 is of fixed capacity whilst the capacity of the metering pumps 20 and 24 may be varied. The capacity of the metering pump 20 is under the influence of a controlling piston 26 arranged within a cylinder 27 and acted upon by a spring 28 so disposed that the right hand end of the piston 26 is subject to the force of the spring whilst the left hand end of the piston 26 is subject to the pressure in the main control pressure passage 22 via a short pipe 29. A rod 32 of the piston 26 has a link 133 connecting it to the metering pump 20 to control its capacity.

The rod 32 is formed at its opposite end as a rack 33 engaged by a gear wheel 34 on a shaft 35 carrying a cam 36 arranged to control the setting of a control valve 37 the purpose of which will be described shortly.

The other variable capacity metering pump 24 is controlled in a similar way by a piston 40 acted on by a spring 41 and by the pressure in the subsidiary control pressure passage 23 through a small pipe 42.

The piston 40, like the piston 26 has a rod 43 and a link 44 connected to the metering pump 24, and also a rack 45 at its other end controlling the setting of a second control valve 46.

The two control valves 37 and 46 are connected together in series by means of a passage 50 and, by means of passages 52 and 51, across the output passage 53 and input passage 54, respectively, of the hydraulic motor 14 driving the web roll 12. The motor 14 is driven by a constantly driven pump 55 and hence the motor 14 will be driven at an input pressure determined by the combined settings of the two control valves 37 and 46, which provide a relief on the input side of the motor 14.

The operation of the apparatus is as follows:

Assuming that initially the rolls 15 and 12 are of the same effective diameter, the two metering pumps 19 and 20 will be rotating at the same speed and therefore if set to run at the same capacity per revolution there will be no substantial pressure in the main control pressure passage 22 since the metering pump 19 will be able to accommodate all that the metering pump 20 supplies.

As the paper builds up on the drum 12, the speed of the drum will drop in relation to that of the roll 15, with the result that the pump 20 will tend to deliver to the passage 22 more fluid than is drawn from the passage 22 by the pump 19. The piston 26 will thus be moved to the right so as to move the link 33 to reduce the capacity of the metering pump so that it delivers only the same amount of fluid as is being withdrawn from the pipe 22 by the pump 19. Thus, during the winding-in operation, as the effective diameter of the drum 12 increases, the piston 26 is moved progressively to reduce the capacity of the pump 20.

As the piston 26 moves to the right, it also acts through the rack 33 and pinion 34 to vary the setting of the relief valve 37, which in turn varies the pressure in the inlet passage 54 of the motor 14, since the pressure maintained in this passage is, as explained, determined jointly by the setting of the valves 37 and 46. The variation thus applied by adjustment of the valve 37 to the pressure in the passage 54 is such as theoretically to vary the torque applied by the motor 14 to the roll 12 in a manner which will maintain a constant tension in the web 10.

At the same time as the speed of the drum 12 falls, the pump 19 delivers fluid to the pipe 23 at a progressively diminishing volumetric rate and thereby causes automatic movement of the piston 40 in such a manner that it acts through the link 44 to adjust the capacity of the pump 24 in the necessary manner to cause this pump to withdraw fluid from the passage 23 at all times at approximately the rate at which the pump 19 is delivering fluid to that passage. This movement of the piston 40 also acts through the rack 45 on the control valve 46 to impose a further variation on the pressure of fluid in the inlet passage 54 of the motor 14, this variation, as will be seen, being in accordance with variations in the absolute speed of the motor 14 and being such as to compensate for the variations in the frictional losses in the motor with variations in its speed.

Thus, while the automatic adjustment of the valve 37 varies the pressure in the passage 54 in a manner theoretically correct (that is to say, disregarding frictional losses) to ensure the maintenance of a constant tension in the web 10, the automatic adjustment of the valve 46 imposes on that theoretically correct variation a further variation which takes into account the fact that the frictional losses in the motor 14 increase and decrease respectively with increases and decreases in speed.

What I claim as my invention and desire to secure by Letters Patent is:

1. Apparatus responsive to changes in the speed ratio between two rotary members, one of which is driven by a hydraulic motor, comprising metering pumps operatively connected to and driven respectively at speeds dependent on the speeds of the two rotary members, at least one of such metering pumps being of the variable capacity type, means for controlling the capacity of said variable capacity metering pump, a main control pressure passage connecting the outlet of said one metering pump to the inlet of the other, a main pressure-responsive device subject to the pressure in the main control pressure passage and arranged to operate the means for varying the capacity of the variable capacity metering pump in a sense tending to maintain a substantially constant pressure in the main control pressure passage and to control the pressure at which working fluid is supplied to the hydraulic motor in accordance with changes in the relative speeds of the two metering pumps, and subsidiary control apparatus operatively connected to the hydraulic motor and to said other metering pump and responsive to variations in the speed of the hydraulic motor, said subsidiary control apparatus automatically modifying in accordance with variations in said hydraulic motor speed the control imposed by the main pressure-responsive device on the pressure at which working fluid is supplied to the hydraulic motor.

2. Apparatus responsive to changes in the speed ratio between two rotary members as claimed in claim 1, in which the main pressure-responsive device includes a first variable pressure relief valve imposing control upon the pressure of actuating fluid supplied to said hydraulic motor while said subsidiary control apparatus includes a second variable relief valve arranged in series with the said first variable relief valve and applying jointly with said first variable relief valve control upon the pressure of actuating fluid supplied to the hydraulic motor.

3. Apparatus as defined in claim 2, in which said other metering pump is driven in accordance with the speed of the hydraulic motor and in which said subsidiary control apparatus includes a further metering pump arranged to be driven at constant speed, the inlet of said further metering pump being connected to the outlet of said metering pump by a subsidiary control pressure passage, and means responsive to changes in pressure in the subsidiary control pressure passage and arranged to control the capacity of said further metering pump in a manner tending to maintain the pressure in the subsidiary control pressure passage constant and to operate the second variable pressure relief valve.

4. Apparatus as defined in claim 3, in which said variable capacity metering pump is driven in accordance with the speed of a web wound by one of said rotary members comprising a winding drum, while said other metering pump is a fixed capacity metering pump driven in accordance with the speed of the hydraulic motor, said main control pressure passage extending between said variable capacity pump and said fixed capacity pump, while the subsidiary control passage extends between the said fixed capacity metering pump and said further metering pump, said further metering pump being a variable capacity metering pump arranged to be driven at a constant speed.

5. Apparatus as claimed in claim 3, in which one of said rotary members comprises a winding drum for a web whereby the pressure at which hydraulic fluid is supplied to the hydraulic motor is dependent jointly upon the effective diameter of the winding drum and the speed of rotation of the winding drum.

References Cited in the file of this patent

UNITED STATES PATENTS

| | | |
|---|---|---|
| 2,573,938 | Tyler et al. | Nov. 6, 1951 |
| 2,764,365 | Davis et al. | Sept. 25, 1956 |